Dec. 29, 1931. C. A. SABBAH 1,839,122
POWER CONVERTING APPARATUS
Filed Aug. 20, 1929
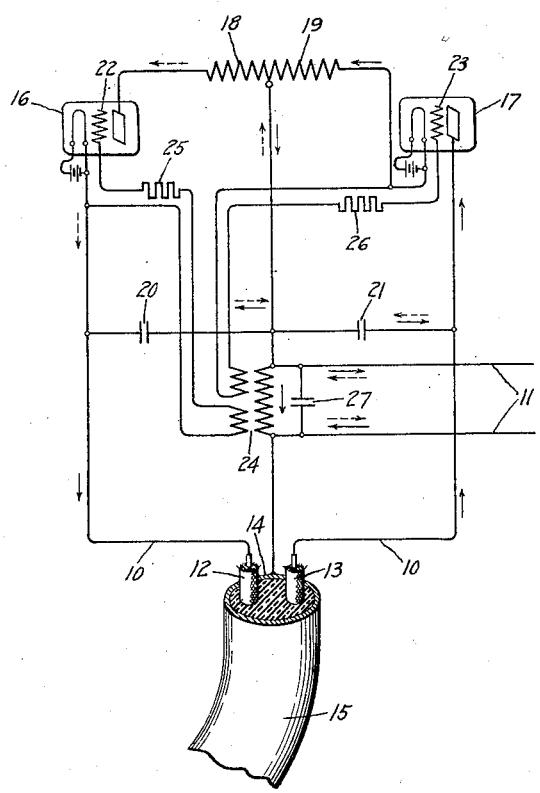
Inventor:
Camil A. Sabbah,
by Charles V. Tulla
His Attorney.

Patented Dec. 29, 1931

1,839,122

UNITED STATES PATENT OFFICE

CAMIL A. SABBAH, OF SCHENECTADY, NEW YORK, ASSIGNOR TO GENERAL ELECTRIC COMPANY, A CORPORATION OF NEW YORK

POWER CONVERTING APPARATUS

Application filed August 20, 1929. Serial No. 387,170.

My invention relates to power converting apparatus such as that utilized to transmit electric power between direct and alternating current circuits or between alternating current circuits operated at different frequencies, and has for its principal object the provision of an improved power converting apparatus which is not subject to the danger of short circuit heretofore encountered in the operation of such apparatus, which may be constructed at comparatively low cost and which may be operated with a high degree of efficiency in connection with electric transmission lines enclosed in cables or the like.

The present invention is an improvement upon and similar in some respects to the power converting apparatus disclosed by my copending application, Serial No. 376,828, filed July 8, 1929 and assigned to the same assignee as the present application. As set forth in the aforesaid copending application, the operation of the apparatus is dependent on the charge and discharge of condensers or of capacity apparatus which operate in a manner similar to condensers.

My invention will be better understood from the following description when considered in connection with the accompanying drawing and its scope will be pointed out in the appended claims.

The drawing illustrates a power converting apparatus wherein my invention has been embodied.

This apparatus includes a pair of direct current input terminals 10 and a pair of alternating current output terminals 11 which are interconnected through means including the capacitance between the conductors 12 and 13 and the sheath 14 of a cable 15, a pair of electric discharge devices 16 and 17 and the opposite halves 18 and 19 of an impedance device or interphase transformer. A pair of capacitance devices or condensers 20 and 21 may be connected across the input circuit in parallel with the capacitance of the cable 15 for the purpose of improving the wave form of the alternating current terminals 11. These condensers however, are not essential to satisfactory operation of the apparatus, and need be provided only when a sine wave of alternating current output potential is required.

The electric discharge devices 16 and 17 are respectively provided with grids 22 and 23. The control potential applied to these grids is derived from a transformer 24 which includes a primary circuit connected to the alternating current output terminal 11 and a pair of secondary circuits respectively connected between the cathode and grid of the device 16 and the cathode and grid of the device 17. Impedance devices such as resistors 25 and 26 are provided in the grid circuits of the valves 16 and 17 for the purpose of limiting the grid currents of these devices. Such grid current limiting devices are of considerable importance where the electric discharge devices 16 and 17 are of the gaseous conduction or vapor electric type. A capacitor 27 may be connected across the alternating current output circuit 11 for a purpose hereinafter explained.

The operation of the apparatus will be readily understood if it be assumed that the valve 17 is conductive and a direct current voltage is applied between the conductors 12 and 13 of the cable 15. Under these conditions current is transmitted through the various parts of the apparatus as indicated by the full line arrows. It will be observed that current flows from the conductor 13 to the valve 17 and from the valve 17 through the reactor 19 either to the condenser 20 or to the upper terminal of the alternating current output circuit 11. From the alternating current output circuit current flows through the capacity coupling between the sheath 14 and the conductor 12 back to the direct current supply circuit. Due to the potential produced by the transformer 24 the device 16 subsequently becomes conductive and the device 17 is rendered non-conductive. When this occurs, current is supplied to the alternating current output terminals as indicated by the broken arrows. The subsequent alternations in the current of the output circuit are of course a repetition of those just described.

In order to regulate the voltage of the output circuit 11, it has been found convenient to connect the condenser 27 across the output circuit in parallel with the primary circuit of the transformer through which potential is applied to the grid circuits of the electric discharge devices 16 and 17. When the transformer is operated near saturation, this arrangement is equivalent to condensers and reactors connected in parallel and having an impedance that varies so that the power factor is either leading or unity, thus insuring the stability of the circuit due to the fact that the grid voltage lags behind that of the anode circuit when the load is varied.

At zero loads or light loads the saturation of the transformer is high and the current absorbed by the capacity 27 is comparatively high. This tends to create a high voltage drop in the circuit. When the load goes up the load voltage decreases so that saturation of the transformer is reduced and the capacity current also decreases. Due to this the voltage drop is reduced and the character of the load voltage is improved.

In the use of this apparatus it has been possible to obtain a drooping or flat frequency characteristic as the load is increased. At low loads the transformer is saturated and both ends of the voltage waves controlling the grids of the tubes are curved downward so that each valve is allowed to start earlier while the other is operating when the frequency is comparatively high. When the load is increased the saturation of the transformer tends to decrease due to the decrease in voltage. Both ends of the voltage wave controlling the grids tend to straighten out so that the starting of the valve is delayed and the frequency is reduced or maintained constant as desired.

The devices 16 and 17 may be of any suitable type, such as a glow discharge device, a device in which ionization of the gas is produced or a device in which current is conducted solely by electrons.

As will be readily understood by those skilled in the art, the utilization of the capacity coupling between the sheath and conductors of the cable has the great advantage that the connections of the apparatus are simplified and its cost is greatly reduced. Where the voltage of the output circuit does not need to be a sine wave, the apparatus comprises merely the inter-phase transformer including reactors 18 and 19, the devices 16 and 17 and means for controlling the potential of the grid circuits of the devices 16 and 17.

Assuming the cable 15 to have a capacity of .15 mfd per 1000 feet for 100 KV and to be 6 miles in length and operated at 60 cycles, the apparatus is capable of supplying a load of the order of 20,000,000 watts. The capacity between each conductor 12 or 13 and the sheath 14 will be twice as great as the capacity between the two conductors, and if the two transmission lines are connected to the direct current terminals of the apparatus as illustrated, the apparatus is capable of delivering 20,000 KW at 100,000 volts and 60 cycles without the necessity of having additional condensers.

What I claim as new and desire to secure by Letters Patent of the United States is:

1. The combination of a cable including a sheath and a pair of conductors enclosed within and insulated from said sheath, a pair of electric discharge devices and an inductance connected between said conductors, a connection from said sheath to said inductance device, and a load circuit associated with the circuits of said electric discharge devices.

2. The combination of a cable including a sheath and a pair of electric conductors enclosed within said sheath and insulated therefrom, a pair of inductance devices inductively related to one another, a pair of electric discharge devices, and an output circuit provided with one terminal connected to said sheath and with another terminal connected to said conductors respectively through different inductance and discharge devices.

3. The combination of a cable including a sheath and a pair of electric conductors enclosed within said sheath and insulated therefrom, a pair of inductance devices inductively related to one another, a pair of electric discharge devices each provided with a grid for controlling the current transmitted between its cathode and anode, an output circuit provided with one terminal connected to said sheath and with another terminal connected to said conductors respectively through different inductance and discharge devices, and means connected to said output circuit for controlling the grid potentials of said electric discharge device.

4. The combination of a cable including a sheath and a pair of electric conductors enclosed within said sheath and insulated therefrom, a pair of inductance devices conductively related to one another, a pair of electric discharge devices each provided with a grid for controlling the current transmitted between its cathode and anode, an output circuit provided with one terminal connected to said sheath and with another terminal connected to said conductors respectively through different inductance and discharge devices, means including a transformer connected to said output circuit for controlling the grid potential of said discharge devices, and capacitance means connected in shunt to said transformer for regulating the voltage of said output circuit.

5. A power converting apparatus including a cable provided with a sheath and with a plurality of conductors insulated from and enclosed within said sheath, a pair of electric discharge devices, each provided with a grid for controlling the current transmitted between its cathode and anode, said discharge devices being connected between a pair of said conductors, an impedance device, provided with an electrical midpoint, connected between said discharge devices, an output circuit provided with terminals connected respectively to said sheath and to said electrical midpoint, means whereby a control potential dependent on the potential of said output circuit is applied to the grid circuit of said discharge device, and means for regulating the potential of said output circuit.

6. A power converting apparatus including a cable provided with a sheath and with a plurality of conductors insulated from and enclosed within said sheath, a pair of electric discharge devices, each provided with a grid for controlling the current transmitted between its cathode and anode, said discharge devices being connected between a pair of said conductors, an impedance device, provided with an electrical midpoint, connected between said discharge devices, an output circuit provided with terminals connected respectively to said sheath and to said electrical midpoint, means whereby a control potential dependent on the potential of said output circuit is applied to the grid circuit of said discharge device, means for regulating the potential of said output circuit, and capacitance means connected between said sheath and said conductor.

7. The combination of a direct current circuit including a cable comprising a sheath and a pair of conductors enclosed within and insulated from said sheath, one of said conductors forming together with said sheath, a capacitor, a plurality of electric discharge devices, a circuit for charging said capacitor from said conductors including one of said discharge devices, a circuit for discharging said capacitor including another of said discharge devices, and an alternating current circuit common to said charging and discharging circuit.

8. The combination of a direct current circuit including a cable comprising a sheath and a pair of conductors enclosed within and insulated from said sheath, each of said conductors forming, together with said sheath, a capacitor, a plurality of electric discharge devices, a circuit for charging each of said capacitors from said conductors, each including one of said electric discharge devices, a discharge circuit for each of said capacitors including another of said discharge devices, and an alternating current circuit common to said charging and discharging circuits.

In witness whereof, I have hereunto set my hand this 19th day of August, 1929.

CAMIL A. SABBAH.